United States Patent
Ando (10) Patent No.: US 11,535,272 B2
(45) Date of Patent: Dec. 27, 2022

(54) VEHICLE SYSTEM FOR AUTONOMOUS CONTROL IN RESPONSE TO ABNORMALITY

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/881,222

(22) Filed: May 22, 2020

(65) Prior Publication Data

US 2020/0377118 A1 Dec. 3, 2020

(30) Foreign Application Priority Data

Jun. 3, 2019 (JP) .............................. JP2019-103565

(51) Int. Cl.
*B60W 50/029* (2012.01)
*B60W 60/00* (2020.01)

(52) U.S. Cl.
CPC ................................ *B60W 60/001* (2020.02)

(58) Field of Classification Search
CPC ................................................. B60W 60/0001
See application file for complete search history.

(56) References Cited

U.S. PATENT DOCUMENTS

| 6,023,612 | A | * | 2/2000 | Harris | ..................... | H03F 1/526 |
| | | | | | | 455/127.1 |
| 2014/0121891 | A1 | * | 5/2014 | Barrett | ..................... | H04L 67/12 |
| | | | | | | 701/33.2 |
| 2016/0368491 | A1 | | 12/2016 | Hauler et al. | | |
| 2017/0282911 | A1 | | 10/2017 | Joyce et al. | | |
| 2020/0055506 | A1 | * | 2/2020 | Michels | ................. | F16D 65/18 |
| 2020/0070661 | A1 | * | 3/2020 | Akuzawa | .............. | B60W 20/50 |
| 2020/0148218 | A1 | * | 5/2020 | Huang | ................ | G05D 1/0088 |
| 2020/0321769 | A1 | * | 10/2020 | Nakamura | ............... | H02H 7/08 |
| 2021/0323522 | A1 | * | 10/2021 | Adler | ........................ | B60T 7/02 |

(Continued)

FOREIGN PATENT DOCUMENTS

| CN | 101795917 A | 8/2010 |
| CN | 107238394 A | 10/2017 |

(Continued)

*Primary Examiner* — Jess Whittington
(74) *Attorney, Agent, or Firm* — Oliff PLC (57) ABSTRACT

A vehicle system includes a first vehicle platform including a first computer configured to operate by means of electric power from a first electric power source and perform traveling control of a vehicle, a second vehicle platform including a second computer configured to operate by means of electric power from a second electric power source different from the first electric power source and perform traveling control of the vehicle, and an autonomous driving platform including a third computer configured to perform autonomous driving control of the vehicle by transmitting a control instruction including data for autonomously driving the vehicle to the first computer when the first vehicle platform is in a normal state and perform autonomous stoppage control of the vehicle by transmitting a control instruction including data for causing the vehicle to autonomously stop to the second computer when the first vehicle platform is in an abnormal state.

1 Claim, 6 Drawing Sheets

(56) References Cited

U.S. PATENT DOCUMENTS

2021/0389810 A1\* 12/2021 Irons ........................ H04L 12/10
2022/0046426 A1\* 2/2022 Schneider ............... H04L 9/321

FOREIGN PATENT DOCUMENTS

| JP | 2016-525038 A | 8/2016 |
| JP | 2018-132015 A | 8/2018 |
| WO | 2009/031014 A2 | 3/2009 |

\* cited by examiner

| DATA NAME | KIND |
| --- | --- |
| DESIGNATION OF DEGREE OF ACCELERATION AND DECELERATION | Input |
| DESIGNATION OF STEERING ANGLE | Input |
| CURRENT VEHICLE SPEED | Output |
| STATE OF STEERING ANGLE | Output |

FIG. 6

VEHICLE SYSTEM FOR AUTONOMOUS CONTROL IN RESPONSE TO ABNORMALITY

INCORPORATION BY REFERENCE

The disclosure of Japanese Patent Application No. 2019-103565 filed on Jun. 3, 2019 including the specification, drawings and abstract is incorporated herein by reference in its entirety.

BACKGROUND

1. Technical Field

The disclosure relates to a vehicle system.

2. Description of Related Art

Research on autonomous driving of a vehicle is being actively carried out. For example, described in Japanese Unexamined Patent Application Publication No. 2018-132015 (JP 2018-132015 A) is a vehicle system in which an autonomous driving ECU having a function of sensing the vicinity of a vehicle is provided in the vehicle separately from an engine ECU and the autonomous driving ECU issues a command to the engine ECU via a vehicle-mounted network.

When an ECU that manages traveling of a vehicle and an ECU for autonomous driving are made independent of each other as in JP 2018-132015 A, it is possible to add an autonomous driving function without applying a great change to an existing vehicle platform. In addition, it can be expected that a third party is prompted to develop an autonomous driving function.

SUMMARY

It is not desirable in a viewpoint of security or the like that the ECU for autonomous driving becomes able to directly control traveling of the vehicle not via the ECU (for example, engine ECU) that manages traveling of the vehicle. In other words, it is desirable that traveling of the vehicle during autonomous driving is indirectly controlled via the ECU that manages traveling of the vehicle without being directly controlled by the ECU for autonomous driving. However, in such a control system, there is a possibility that it becomes difficult to appropriately stop the vehicle by means of the ECU for autonomous driving in a case where the ECU that manages traveling of the vehicle becomes not able to be normally operated as in a case where there is an abnormality in an electric power source for the ECU that manages traveling of the vehicle.

The disclosure provides a highly reliable vehicle system.

An aspect of the disclosure relates to a vehicle system including a first vehicle platform, a second vehicle platform, and an autonomous driving platform. The first vehicle platform includes a first computer configured to operate by means of electric power supplied from a first electric power source and perform traveling control of a vehicle. The second vehicle platform includes a second computer configured to operate by means of electric power supplied from a second electric power source different from the first electric power source and perform traveling control of the vehicle. The autonomous driving platform includes a third computer configured to perform autonomous driving control of the vehicle by transmitting a control instruction including data for autonomously driving the vehicle to the first computer when the first vehicle platform is in a normal state and perform autonomous stoppage control of the vehicle by transmitting a control instruction including data for causing the vehicle to autonomously stop to the second computer when the first vehicle platform is in an abnormal state.

According to the aspect of the disclosure, it is possible to provide a highly reliable vehicle system.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

A configuration in which a vehicle platform including a computer that manages power of a vehicle and an autonomous driving platform that performs determination relating to autonomous driving are installed in a vehicle system independently of each other can be conceived. For example, the autonomous driving platform senses the vicinity of the vehicle and transmits a control instruction to an existing vehicle platform based on the result of a sensing operation. Then, the vehicle platform controls the degree of acceleration and deceleration or the steering angle of the vehicle based on the control instruction from the autonomous driving platform. With such a configuration, the platforms can be developed by vendors independent of each other and thus it is possible to prompt a third party to develop an autonomous driving function.

Here, when there is an abnormality in an electric power source or the like for the vehicle platform, it may not be possible for the vehicle platform to appropriately process the control instruction from the autonomous driving platform. When the vehicle platform is a single-system platform in such a case, it may be difficult to appropriately stop the vehicle by means of the autonomous driving platform.

Therefore, in a vehicle system according to the present embodiment, a vehicle platform is configured in two systems: a first vehicle platform that operates by means of electric power supplied from a first electric power source and a second vehicle platform that operates by means of electric power supplied from a second electric power source. In this case, the first electric power source and the second electric power source are configured as electric power sources independent of each other. In addition, the autonomous driving platform communicates with one of the two systems of vehicle platforms to control a vehicle. For example, in a case where the first vehicle platform is in a normal state, a computer (third computer) of the autonomous driving platform transmits a control instruction including data for autonomously driving the vehicle to a computer (first computer) of the first vehicle platform to perform autonomous driving control of the vehicle. In addition, in a case where the first vehicle platform is in an abnormal state, the third computer of the autonomous driving platform transmits a control instruction including data for causing the vehicle autonomously stop to a computer (second computer) of the second vehicle platform to perform autonomous stoppage control of the vehicle.

With the vehicle system configured as described above, even in a case where the first vehicle platform enters a state of being not able to operate normally due to an abnormality in the first electric power source or the like, the autonomous driving platform can control the vehicle by using the second vehicle platform that is operatable by means of the second electric power source which is different from the first electric power source. As a result, even in a case where the first vehicle platform enters a state of being not able to operate normally, it is possible to appropriately stop the vehicle. Therefore, it is possible to provide a highly reliable vehicle system.

Meanwhile, in a case where platforms developed by different vendors are caused to coexist in the same vehicle system, that is, in a case where a power system for a vehicle and an autonomous driving system that issues a control instruction to the power system are connected to the same vehicle-mounted network, several problems occur. One of the problems is a problem that a command for controlling the vehicle platform is different for each maker or each vehicle type. For example, since the input and output of an engine ECU are different for each maker or each vehicle type, making an autonomous driving ECU conformable to every vehicle type is costly. In addition, since various items of information for controlling the vehicle flow to the vehicle-mounted network, it is not preferable in a viewpoint of security that the autonomous driving platform (which is manufactured by third person not directly relating to vehicle platform) is permitted to access the information without limitation.

Therefore, the vehicle system according to the present embodiment may further include a vehicle control interface for relaying information that is exchanged between the first vehicle platform and the autonomous driving platform and information that is exchanged between the second vehicle platform and the autonomous driving platform.

Figure 1:
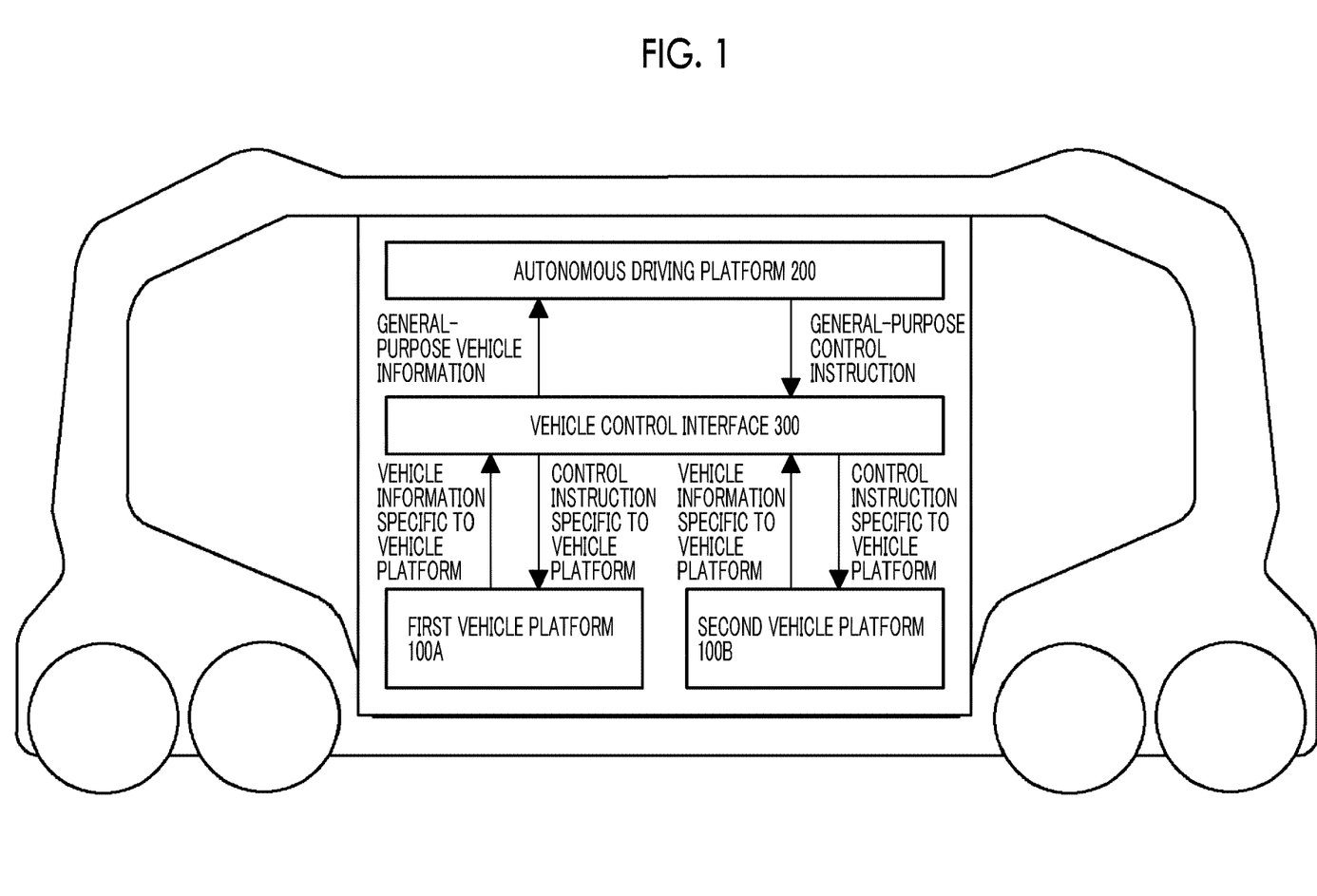
FIG. 1 is a schematic diagram illustrating a vehicle system according to an embodiment.

Here, FIG. 1 shows a schematic diagram illustrating the vehicle system according to the present embodiment. As shown in FIG. 1, a first vehicle platform 100A is a platform including a first computer (for example, engine ECU) that performs traveling control of the vehicle. As with the first vehicle platform 100A, a second vehicle platform 100B is a platform including a second computer that performs traveling control of the vehicle. An autonomous driving platform 200 is a platform including a third computer (for example, autonomous driving ECU) that performs autonomous driving control of the vehicle. The autonomous driving platform 200 may include means for sensing the vicinity of the vehicle or means for generating a plan about a traveling operation based on the result of a sensing operation. A vehicle control interface 300 may be configured to connect the first vehicle platform 100A and the autonomous driving platform 200 to each other and connect the second vehicle platform 100B and the autonomous driving platform 200 to each other. In addition, the vehicle control interface 300 may be configured to relay information that is input and output between the first vehicle platform 100A and the autonomous driving platform 200 and relay information that is input and output between the second vehicle platform 100B and the autonomous driving platform 200. Here, the vehicle control interface 300 acquires, from the third computer of the autonomous driving platform 200, a first control instruction that includes data for controlling the first computer of the first vehicle platform 100A or the second computer of the second vehicle platform 100B, for example. Then, the vehicle control interface 300 converts the first control instruction into a second control instruction with respect to the first computer or the second computer. Then, the vehicle control interface 300 transmits the second control instruction to the first computer or the second computer. By configuring the vehicle control interface 300 to have such a function, it is possible to improve the general-purpose properties of the autonomous driving platform 200 while securing security of the first vehicle platform 100A and the second vehicle platform 100B.

Note that, the first control instruction may be generated as a general-purpose instruction not specific to the first computer and the second computer that the vehicle includes. In addition, the vehicle control interface 300 may be configured to convert the first control instruction into the second control instruction which is data specific to the first computer and the second computer. In the case of such a configuration, a general-purpose instruction can be converted into an instruction specific to a vehicle type or a maker.

EMBODIMENTS

The outline of a vehicle system according to a first embodiment will be described. As shown in FIG. 1, the vehicle system according to the present embodiment is provided with two systems of vehicle platforms including the first vehicle platform 100A and the second vehicle platform 100B, the autonomous driving platform 200, and the vehicle control interface 300.

The first vehicle platform 100A and the second vehicle platform 100B are vehicle platforms in the related art. The first vehicle platform 100A and the second vehicle platform 100B operate based on a control instruction specific to the vehicle and generate vehicle information specific to the vehicle. The control instruction or the vehicle information is encapsulated by means of CAN frames flowing in a vehicle-mounted network, for example.

The autonomous driving platform 200 includes means for sensing the vicinity of the vehicle and issues a control instruction not specific to a vehicle type or a maker. In addition, the autonomous driving platform 200 acquires vehicle information not specific to a vehicle type or a maker.

The vehicle control interface 300 converts a control instruction (that is, control instruction that first vehicle platform 100A and second vehicle platform 100B can interpret) specific to the vehicle and a control instruction (that is, control instruction that is generated by autonomous driving platform 200) not specific to the vehicle into each other. In addition, the vehicle control interface 300 converts vehicle information (that is, vehicle information that is generated by first vehicle platform 100A or second vehicle platform 100B) specific to the vehicle and vehicle information (that is, vehicle information that autonomous driving platform 200 can interpret) not specific to the vehicle into each other.

System Configuration

Figure 2:
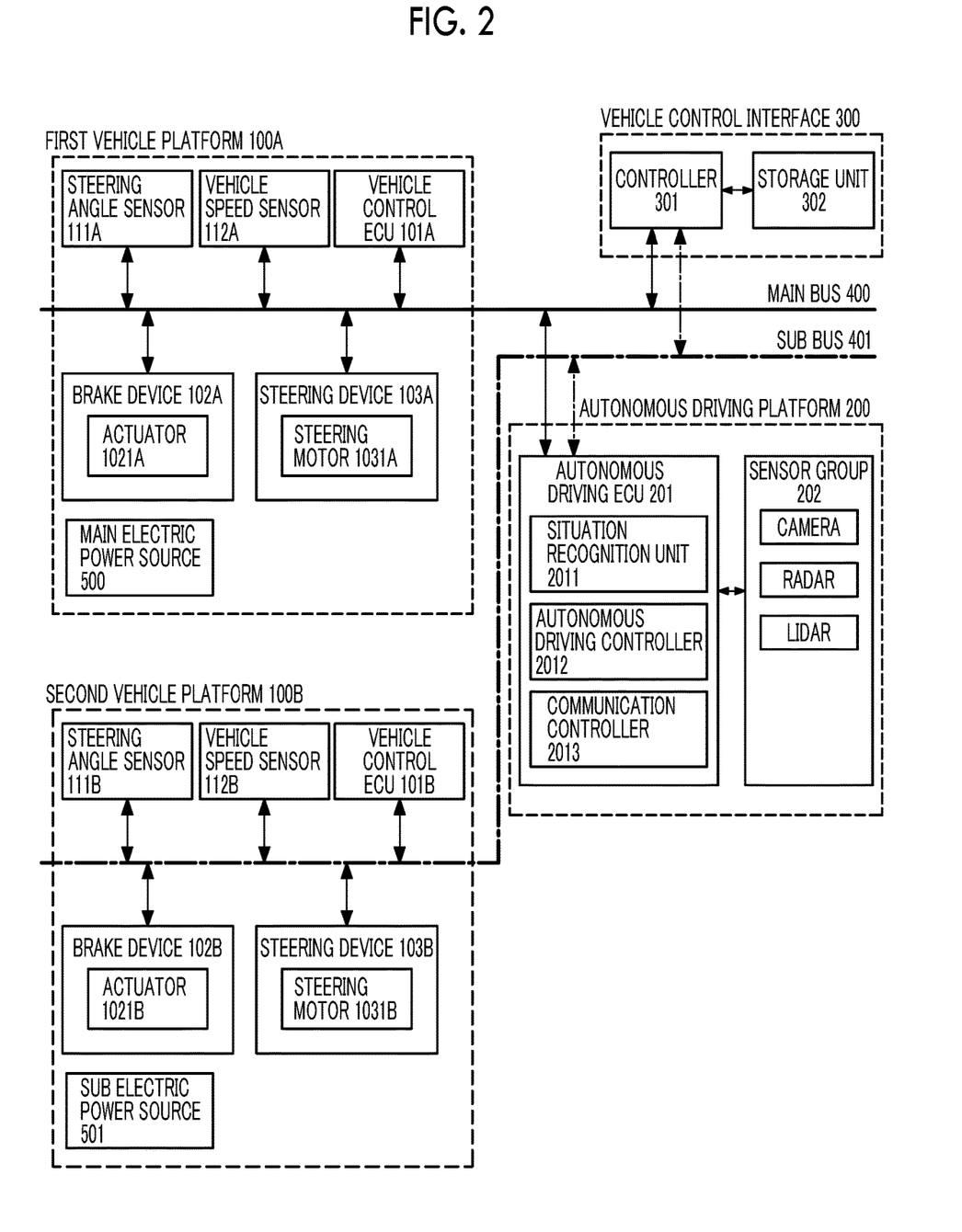
FIG. 2 is a block diagram schematically illustrating an example of constituent elements that the vehicle system includes.

Next, constituent elements of the system will be described in detail. FIG. 2 is a block diagram schematically illustrating an example of the configuration of the vehicle system shown in FIG. 1. The vehicle system includes the first vehicle platform 100A, the second vehicle platform 100B, the autonomous driving platform 200, and the vehicle control interface 300. The first vehicle platform 100A is communicatably connected to the autonomous driving platform 200 and the vehicle control interface 300 via a main bus 400. The second vehicle platform 100B is communicatably connected to the autonomous driving platform 200 and the vehicle control interface 300 via a sub bus 401.

The first vehicle platform 100A includes a vehicle control ECU 101A, a brake device 102A, a steering device 103A, a steering angle sensor 111A, and a vehicle speed sensor 112A and each of those constituent elements is configured to operate by means of electric power supplied from a main electric power source 500. Note that, although a vehicle with an engine is used as an example in the present example, a target vehicle may be an electric vehicle. In this case, an engine ECU can be substituted with an ECU managing the power of the vehicle. Note that, in the first vehicle platform 100A, an ECU or a sensor other than those illustrated may be provided.

The vehicle control ECU 101A is a computer that controls constituent elements (for example, engine system component, powertrain system component, brake system component, electric system component, body system component, or like) of the vehicle. The vehicle control ECU 101A may be a combination of a plurality of computers.

The vehicle control ECU 101A controls the rotation rate of an engine by performing fuel injection control, for example. The vehicle control ECU 101A can control the rotation rate of the engine based on a control instruction (for example, instruction designating throttle valve opening degree) generated due to an operation (operation on accelerator pedal or like) performed by an occupant, for example.

In addition, in a case where the vehicle is an electric vehicle, the vehicle control ECU 101A can control the rotation rate of a motor by controlling a drive voltage, a drive current, a drive frequency, or the like. In this case as well, as with a vehicle in which an engine serves as a motor, it is possible to control the rotation rate of the motor based on a control instruction generated due to an operation performed by an occupant. In addition, it is possible for the vehicle control ECU 101A to control a regenerative current based on a control instruction indicating a depressing force on a brake pedal or the degree of regenerative braking. Note that, in a case where the vehicle is a hybrid vehicle, both of control with respect to an engine and control with respect to a motor may be performed by the vehicle control ECU 101A.

In addition, the vehicle control ECU 101A can control a braking force of a mechanical brake by controlling an actuator 1021A included in the brake device 102A, which will be described later. The vehicle control ECU 101A controls brake hydraulic pressure by driving the actuator 1021A based on a control instruction (for example, instruction indicating depressing force on brake pedal) generated due to an operation (operation on brake pedal or like) performed by an occupant.

In addition, the vehicle control ECU 101A can control a steering angle or the angle of steered wheels (steering angle) by controlling a steering motor 1031A included in the steering device 103A, which will be described later. The vehicle control ECU 101A controls the steering angle of the vehicle by driving the steering motor 1031A based on a control instruction (for example, instruction indicating steering angle) generated due to an operation (steering operation or like) performed by an occupant.

Note that, a control instruction may be generated in the first vehicle platform 100A based on an operation performed by an occupant and may be generated outside the first vehicle platform 100A (for example, may be generated by device that controls autonomous driving).

The brake device 102A is a mechanical brake system that the vehicle includes. The brake device 102A is configured to include an interface (brake pedal or like), the actuator 1021A, a hydraulic pressure system, a brake cylinder, and the like. The actuator 1021A is means for controlling the hydraulic pressure in the brake system. With the actuator 1021A controlling the brake hydraulic pressure when receiving an instruction from the vehicle control ECU 101A, it is possible to secure a braking force of a mechanical brake. Note that, the brake device 102A may be configured to include a parking lock device that is able to mechanically switch between a parking lock state in which rotation of axles is locked and a non-parking lock state achieved when the parking lock state is terminated and an actuator for driving the parking lock device, in addition to the mechanical brake system as described above. In this case, a switch between a state where the rotation of the wheels is locked and a state where the rotation of the wheels is not locked can be made with the actuator switching between the parking lock state and the non-parking lock state of the parking lock device after receiving an instruction from the vehicle control ECU 101A.

The steering device 103A is a steering system that the vehicle includes. The steering device 103A is configured to include an interface (steering wheel or like), the steering motor 1031A, a gearbox, a steering column, and the like. The steering motor 1031A is means for assisting a steering operation. With the steering motor 1031A being driven when receiving an instruction from the vehicle control ECU 101A, a force needed for the steering operation can be reduced. In addition, it is also possible to achieve automation of the steering operation, which does not depend on an operation performed by the occupant, by driving the steering motor 1031A.

The steering angle sensor 111A is a sensor that measures a steering angle obtained through a steering operation. A measured value obtained by the steering angle sensor 111A is transmitted to the vehicle control ECU 101A as needed. Although a value that directly indicates the turning angle of tires is used as the steering angle in the present embodiment, a value that indirectly indicates the turning angle of tires may also be used as the steering angle.

The vehicle speed sensor 112A is a sensor that measures the speed of the vehicle. A measured value obtained by the vehicle speed sensor 112A is transmitted to the vehicle control ECU 101A as needed.

The second vehicle platform 100B includes a vehicle control ECU 101B, a brake device 102B, a steering device 103B, a steering angle sensor 111B, and a vehicle speed sensor 112B and each of those constituent elements is configured to operate by means of electric power supplied from a sub electric power source 501. The brake device 102B is configured to include an actuator 1021B. The steering device 103B is configured to include a steering motor 1031B. Note that, in the present example, the functions of the vehicle control ECU 101B, the brake device 102B, the actuator 1021B, the steering device 103B, the steering motor 1031B, the steering angle sensor 111B, and the vehicle speed sensor 112B are the same as the vehicle control ECU 101A, the brake device 102A, the actuator 1021A, the steering device 103A, the steering motor 1031A, the steering angle sensor 111A, and the vehicle speed sensor 112A of the first vehicle platform 100A. The sub electric power source 501 is an electric power source different from the main electric power source 500 described above.

Next, the autonomous driving platform 200 will be described. The autonomous driving platform 200 is a device that senses the vicinity of the vehicle, generates a plan about a traveling operation based on the result of a sensing operation, and issues an instruction with respect to the first vehicle platform 100A or the second vehicle platform 100B according to the plan. The autonomous driving platform 200 may be developed by a maker or a vendor different from that of the first vehicle platform 100A and the second vehicle platform 100B. Such an autonomous driving platform 200 is configured to include an autonomous driving ECU 201 and a sensor group 202.

The autonomous driving ECU 201 is a computer that performs determination about autonomous driving based on data acquired from the sensor group 202, which will be described later, and communicates with the first vehicle platform 100A or the second vehicle platform 100B to control the vehicle. The autonomous driving ECU 201 is configured by using, for example, a central processing unit (CPU). The autonomous driving ECU 201 is configured to include three functional modules, which are a situation recognition unit 2011, an autonomous driving controller 2012, and a communication controller 2013. Each functional module may be realized with a CPU executing a program stored in storage means such as a read only memory (ROM).

The situation recognition unit 2011 detects a surrounding environment around the vehicle based on data acquired by a sensor included in the sensor group 202, which will be described later. Examples of a target to be detected include the number of lanes or the positions of lanes, the number of vehicles present in the vicinity of a host vehicle or the positions of the other vehicles, the number of obstacles (for example, pedestrian, bicycle, structure, and building) present in the vicinity of the host vehicle or the positions of the obstacles, the structure of a road, and a traffic sign. However, the target to be detected is not limited thereto. The target to be detected may be any type of target that needs to be detected for autonomous travel. Data about the environment detected by the situation recognition unit 2011 (hereinafter, referred to as environment data) is transmitted to the autonomous driving controller 2012, which will be described later.

The autonomous driving controller 2012 uses the environment data generated by the situation recognition unit 2011 to control traveling of the host vehicle. For example, the autonomous driving controller 2012 generates a traveling trajectory of the host vehicle based on the environment data and determines the degree of acceleration and deceleration and the steering angle of the vehicle such that the vehicle travels along the traveling trajectory. Information determined by the autonomous driving controller 2012 is transmitted to the first vehicle platform 100A (vehicle control ECU 101A) or the second vehicle platform 100B (vehicle control ECU 101B) via the vehicle control interface 300 which will be described later. As a method of causing the vehicle to autonomously travel, a known method can be adopted.

In the present embodiment, the autonomous driving controller 2012 generates an instruction relating to acceleration and deceleration of the vehicle, an instruction relating to the steering of the vehicle, and an instruction relating to a switch between the parking lock state and the non-parking lock state of the parking lock device, as a first control instruction. However, in a case where the first vehicle platform 100A is in a normal state, the autonomous driving controller 2012 generates the instruction relating to acceleration and deceleration of the vehicle and the instruction relating to the steering of the vehicle solely. Hereinafter, the instruction relating to acceleration and deceleration of the vehicle will be referred to as an acceleration and deceleration instruction, the instruction relating to the steering of the vehicle will be referred to as a steering instruction, and the instruction relating to a switch between the parking lock state and the non-parking lock state of the parking lock device will be referred to as a parking lock switching instruction. The acceleration and deceleration instruction, the steering instruction, and the parking lock switching instruction are common instructions that do not depend on a vehicle type or a maker. In the present example, the acceleration and deceleration instruction is information designating the degree of acceleration and deceleration of the vehicle and the steering instruction is information designating the steering angle of the steered wheels that the vehicle includes.

Note that, in the present embodiment, in a case where an abnormality in the first vehicle platform 100A that is caused by an abnormality or the like in the main electric power source 500 occurs while autonomous driving control of the vehicle is being performed by means of the first vehicle platform 100A, the autonomous driving controller 2012 performs autonomous stoppage control of the vehicle by means of the second vehicle platform 100B. For example, first, the autonomous driving controller 2012 generates a traveling trajectory for causing the vehicle to move to a place where the vehicle can be stopped, based on the environment data generated by the situation recognition unit 2011. Next, the autonomous driving ECU 201 determines the degree of acceleration and deceleration and the steering angle of the vehicle such that the vehicle travels along the generated traveling trajectory and is stopped at the place where the vehicle can be stopped. Instructions (acceleration and deceleration instruction and steering instruction) indicating the degree of acceleration and deceleration and the steering angle determined in this manner are transmitted to the second vehicle platform 100B (vehicle control ECU 101B) via the vehicle control interface 300, which will be described later. Accordingly, the vehicle control ECU 101B can cause the vehicle to travel to the place where the vehicle can be stopped and stop the vehicle at the place where the vehicle can be stopped. In addition, when the autonomous driving ECU 201 detects that the vehicle has been stopped at the place where the vehicle can be stopped based on the environment data generated by the situation recognition unit 2011, information relating to the state of the vehicle provided from the second vehicle platform 100B, or the like, the autonomous driving ECU 201 generates a parking lock switching instruction for switching the parking lock device from a non-parking lock state to a parking lock state. Such a parking lock switching instruction is transmitted to the second vehicle platform 100B (vehicle control ECU 101B) via the vehicle control interface 300 which will be described later. Accordingly, the vehicle control ECU 101B can switch the parking lock device of the second vehicle platform 100B from the non-parking lock state to the parking lock state. As a result, the vehicle is restrained from being accidentally moved by the vehicle's own weight from the place where the vehicle can be stopped.

The communication controller 2013 switches the transmission destination of a first control instruction. In the present example, in a case where the first vehicle platform 100A is in a normal state, the communication controller 2013 transmits a first control instruction such that the transmission destination of the first control instruction becomes the first vehicle platform 100A. Specifically, the communication controller 2013 outputs the first control instruction to the main bus 400. In this case, the vehicle control interface 300 which will be described later converts the first control instruction received via the main bus 400 into a second control instruction that the first vehicle platform 100A (vehicle control ECU 101A) can interpret. Then, the vehicle control interface 300 transmits the second control instruction after the conversion to the first vehicle platform 100A via the main bus 400. Accordingly, the vehicle is controlled by the vehicle control ECU 101A of the first vehicle platform 100A such that the vehicle is autonomously driven. In addition, in a case where an abnormality in the first vehicle platform 100A that is caused by an abnormality or the like in the main electric power source 500 occurs, the communication controller 2013 transmits a first control instruction such that the transmission destination of the first control instruction becomes the second vehicle platform 100B. Specifically, the communication controller 2013 outputs the first control instruction to the sub bus 401. In this case, the vehicle control interface 300 which will be described later converts the first control instruction received via the sub bus 401 into a second control instruction that the second vehicle platform 100B (vehicle control ECU 101B) can interpret. Then, the vehicle control interface 300 transmits the second control instruction after the conversion to the second vehicle platform 100B via the sub bus 401. Accordingly, the vehicle is controlled by the vehicle control ECU 101B of the second vehicle platform 100B such that the vehicle is caused to autonomously stop.

The sensor group 202 is means for sensing the vicinity of the vehicle, and is typically configured to include a monocular camera, a stereo camera, a radar, a LIDAR, a laser scanner, and the like. The sensor group 202 may include means (GPS module or like) for acquiring the current position of the vehicle in addition to means for sensing the vicinity of the vehicle. Information acquired by a sensor included in the sensor group 202 is transmitted to the autonomous driving ECU 201 (situation recognition unit 2011) as needed.

Next, the vehicle control interface 300 will be described. A control instruction (first control instruction) handled by the vehicle control ECUs 101A, 101B in the present embodiment is specific to the vehicle or a maker. Meanwhile, the autonomous driving platform 200 is a device that is developed by a third party and is supposed to be installed in various types of vehicles of various makers. That is, connecting the vehicle platform 100 and the autonomous driving platform 200 to the same vehicle-mounted network is costly. Therefore, in the present embodiment, the vehicle control interface 300 is used as a device that converts and relays data exchanged between both of the vehicle control ECUs 101A, 101B and the autonomous driving ECU 201.

Figure 3:
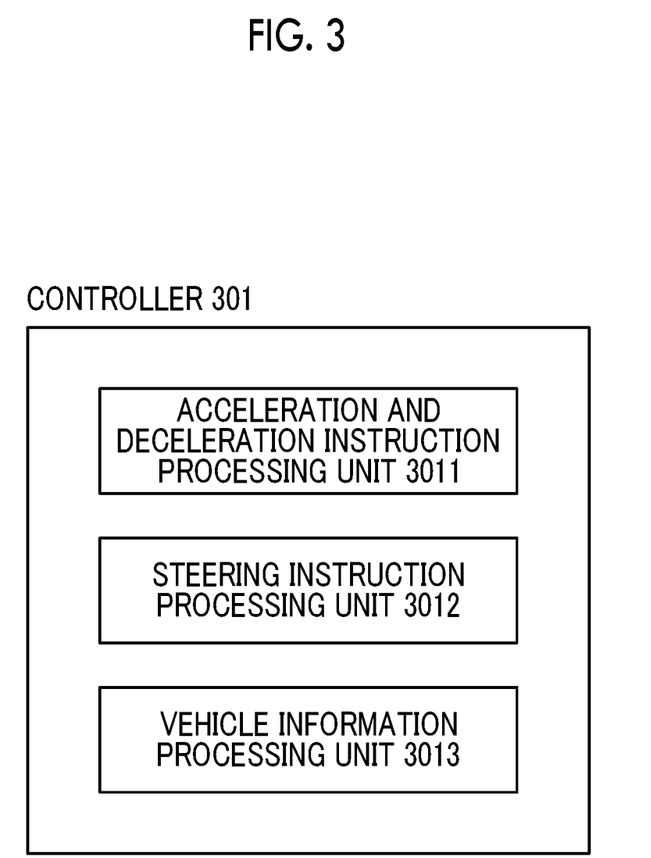
FIG. 3 is a block diagram showing a functional configuration of a controller in a vehicle control interface.

The controller 301 is a computer that converts a control instruction handled by the vehicle control ECUs 101A, 101B and a control instruction handled by the autonomous driving ECU 201 into each other. The controller 301 is configured by using, for example, a central processing unit (CPU). As shown in FIG. 3, the controller 301 is configured to include three functional modules which are an acceleration and deceleration instruction processing unit 3011, a steering instruction processing unit 3012, and a vehicle information processing unit 3013. Each functional module may be realized with a CPU executing a program stored in the storage unit 302 which will be described later.

The acceleration and deceleration instruction processing unit 3011 receives an acceleration and deceleration instruction (first control instruction) from the autonomous driving ECU 201 and converts the acceleration and deceleration instruction into data (second control instruction (hereinafter, referred to as control data)) that the vehicle control ECUs 101A, 101B can interpret. Specifically, the degree of acceleration and deceleration (for example, +3.0 km/h/s) designated by the acceleration and deceleration instruction is converted into data denoting a throttle valve opening degree, data denoting a brake pressure, or data denoting a parking lock state or a non-parking lock state of the parking lock device. A conversion process for the acceleration and deceleration instruction is performed by means of conversion information stored in the storage unit 302 which will be described later. Note that, although a throttle valve opening degree, a brake pressure, and a parking lock state/non-parking lock state are used as an example of the control data in the present example, the control data may be other than those as long as the control data relates to acceleration and deceleration of the vehicle, whether to lock or unlock rotation of the wheels, or the like. For example, the control data may be a target rotation rate of a motor or an electric current value. In addition, the control data after the conversion is transmitted in a protocol or format specific to the first vehicle platform 100A and the second vehicle platform 100B. At this time, in a case where the acceleration and deceleration instruction from the autonomous driving ECU 201 is an acceleration and deceleration instruction transmitted via the main bus 400, the control data after the conversion is transmitted to the first vehicle platform 100A via the main bus 400. Meanwhile, in a case where the acceleration and deceleration instruction from the autonomous driving ECU 201 is an acceleration and deceleration instruction transmitted via the sub bus 401, the control data after the conversion is transmitted to the second vehicle platform 100B via the sub bus 401.

The steering instruction processing unit 3012 receives a steering instruction (first control instruction) from the autonomous driving ECU 201 and converts the steering instruction into control data that the vehicle control ECUs 101A, 101B can interpret by using the conversion information. Specifically, the control data is converted into data denoting a steering angle that is specific to the first vehicle platform 100A and the second vehicle platform 100B. A conversion process for the steering instruction is performed by means of conversion information stored in the storage unit 302 which will be described later. Note that, although the turning angle of tires is used as an example of the steering angle in the present example, the control data may be other than the turning angle as long as the control data is an instruction that relates to the steering of the vehicle. For example, the data may be data directly or indirectly indicating the angle of a steering wheel, a percentage with respect to the maximum turning angle, or the like. In addition, the control data after the conversion is transmitted in a protocol or format specific to the first vehicle platform 100A and the second vehicle platform 100B. At this time, in a case where the steering instruction from the autonomous driving ECU 201 is a steering instruction transmitted via the main bus 400, the control data after the conversion is transmitted to the first vehicle platform 100A via the main bus 400. Meanwhile, in a case where the steering instruction from the autonomous driving ECU 201 is a steering instruction transmitted via the sub bus 401, the control data after the conversion is transmitted to the second vehicle platform 100B via the sub bus 401.

The vehicle information processing unit 3013 receives information about the state of the vehicle from the vehicle control ECUs 101A, 101B and converts the information into information (information not specific to vehicle type) that the autonomous driving ECU 201 can interpret. Specifically, the vehicle information processing unit 3013 converts information transmitted in a protocol or format specific to the first vehicle platform 100A and the second vehicle platform 100B into information (hereinafter, referred to as feedback data) of a common format. Hereinafter, the information about the state of the vehicle will be referred to as sensor data. The sensor data is data based on information acquired by the steering angle sensors 111A, 111B or the vehicle speed sensors 112A, 112B and is transmitted to the vehicle-mounted network by the vehicle control ECUs 101A, 101B, for example. The sensor data may be any data such as vehicle speed information, information about the turning angle of tires, information about the steering angle as long as feedback can be given to the autonomous driving ECU 201, for example. In the present embodiment, the vehicle information processing unit 3013 converts sensor data relating to the current vehicle speed and the state of the steering angle.

Figure 4:
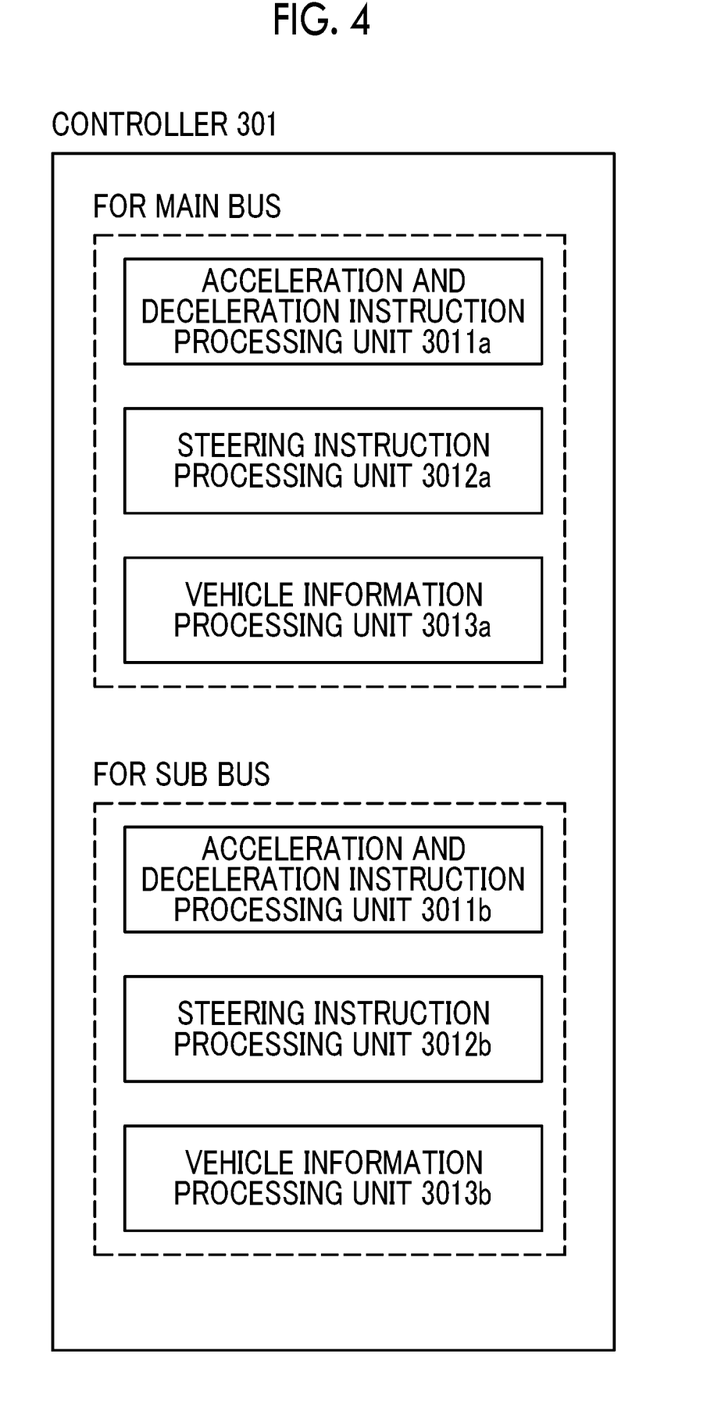
FIG. 4 is a block diagram showing another example of the functional configuration of the controller in the vehicle control interface.

Here, the acceleration and deceleration instruction processing unit 3011, the steering instruction processing unit 3012, and the vehicle information processing unit 3013 are configured as one system of functional modules in an example shown in FIG. 3. However, as shown in FIG. 4, the acceleration and deceleration instruction processing unit 3011, the steering instruction processing unit 3012, and the vehicle information processing unit 3013 may be configured in two systems: functional modules (acceleration and deceleration instruction processing unit 3011a, steering instruction processing unit 3012a, and vehicle information processing unit 3013a) for the main bus 400 and functional modules (acceleration and deceleration instruction processing unit 3011b, steering instruction processing unit 3012b, and vehicle information processing unit 3013b) for the sub bus 401. That is, in the vehicle control interface 300, functional modules that convert and relay data exchanged between the vehicle control ECUs 101A, 101B and the autonomous driving ECU 201 may be configured in two systems: a system for the first vehicle platform 100A (vehicle control ECU 101A) and a system for the second vehicle platform 100B (vehicle control ECU 101B). Accordingly, it is possible to realize the functional modules for the first vehicle platform 100A and the functional modules for the second vehicle platform 100B with one computer.

The storage unit 302 is means for storing information and is configured by using a storage medium such as a RAM, a magnetic disk, and a flash memory. The storage unit 302 stores information (hereinafter, referred to as conversion information) for converting an acceleration and deceleration instruction and a steering instruction generated by the autonomous driving ECU 201 (autonomous driving controller 2012) and control data that the vehicle control ECUs 101A, 101B can interpret, into each other. Furthermore, the conversion information includes information for converting sensor data specific to the vehicle into feedback data.

The conversion information includes, for example, the configuration of control data input or output with respect to the vehicle control ECUs 101A, 101B, the parameter thereof, and a table or a formula for converting an input value into a parameter. In addition, the conversion information includes the configuration of sensor data output from the vehicle control ECUs 101A, 101B, the parameter thereof, a table or a formula for converting a parameter into a physical value, and the like.

Figure 5:
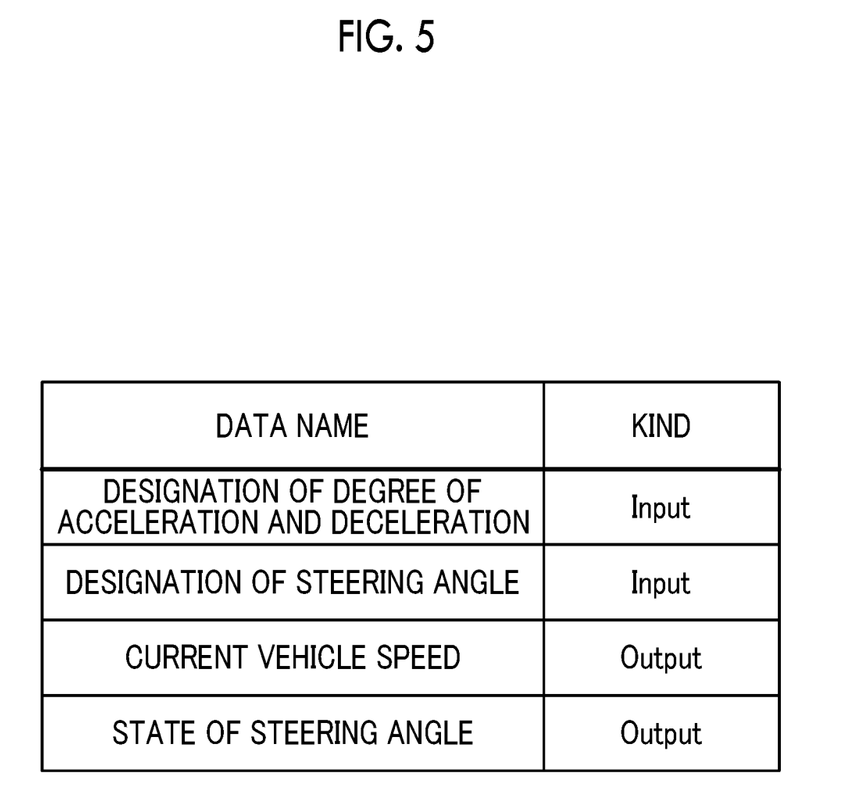
FIG. 5 is a diagram showing data to be converted.

FIG. 5 is a diagram illustrating the kinds of data converted by means of the conversion information. "Input" in FIG. 5 means that data is from the autonomous driving ECU 201 to the vehicle control ECUs 101A, 101B and "Output" means that data is from the vehicle control ECUs 101A, 101B to the autonomous driving ECU 201. As described above, an instruction relating to the degree of acceleration and deceleration and a steering angle is transmitted from the autonomous driving ECU 201 to the vehicle control ECUs 101A, 101B and data relating to the current vehicle speed and the state of the steering angle is transmitted from the vehicle control ECUs 101A, 101B to the autonomous driving ECU 201. Note that, in a case where data other than those shown in FIG. 5 is transmitted to the vehicle control interface 300, the data may be discarded.

In the vehicle system according to the present embodiment, communication between the first vehicle platform 100A or the second vehicle platform 100B and the autonomous driving platform 200 is performed due to the above-described configuration.

Flow of Processing

Figure 6:
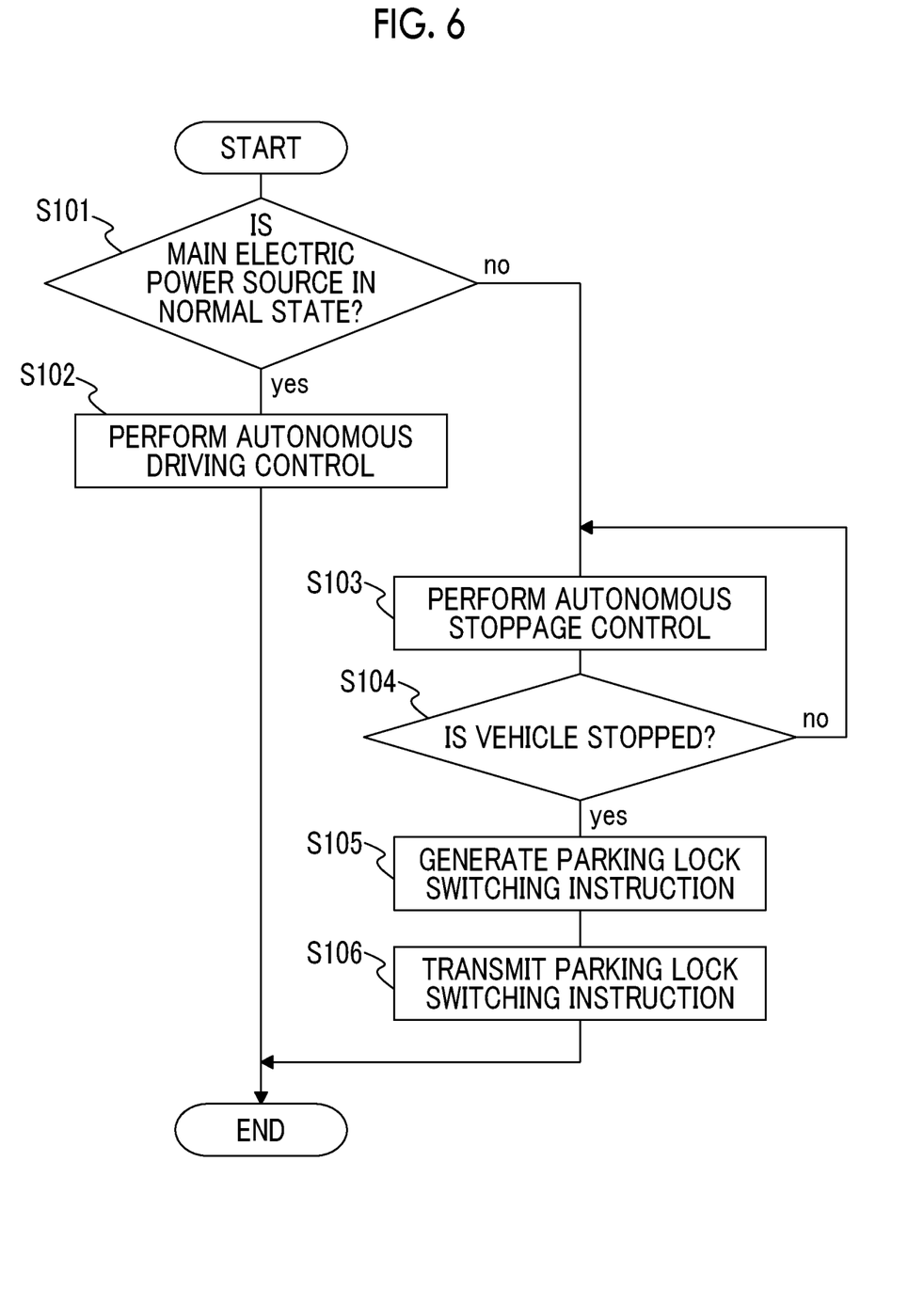
FIG. 6 is a flowchart showing the flow of processing that is performed by an autonomous driving platform in an embodiment.

Next, processing performed in the autonomous driving platform 200 in the vehicle system according to the present embodiment will be described with reference to FIG. 6. FIG. 6 is a flowchart showing the flow of processing that is performed by the autonomous driving ECU 201 each time a predetermined period elapses while the autonomous driving platform 200 is performing autonomous driving control of the vehicle by means of the first vehicle platform 100A.

As shown in FIG. 6, the autonomous driving ECU 201 determines whether or not the main electric power source 500 is in a normal state (step S101). Here, when the main electric power source 500 is in the normal state (result of determination in step S101 is positive), the autonomous driving ECU 201 continues the autonomous driving control (step S102). In the autonomous driving control, the autonomous driving controller 2012 uses environment data generated by the situation recognition unit 2011 to control traveling of a host vehicle. That is, the autonomous driving controller 2012 generates a traveling trajectory of the host vehicle based on the environment data and determines the degree of acceleration and deceleration and the steering angle of the vehicle such that the vehicle travels along the traveling trajectory. Then, the autonomous driving controller 2012 generates an acceleration and deceleration instruction indicating the determined degree of acceleration and deceleration and a steering instruction indicating the determined steering angle. The acceleration and deceleration instruction and the steering instruction generated by the autonomous driving controller 2012 are transmitted to the vehicle control interface 300 by the communication controller 2013. At this time, the communication controller 2013 transmits the acceleration and deceleration instruction and the steering instruction to the vehicle control interface 300 via the main bus 400. The acceleration and deceleration instruction that is transmitted from the autonomous driving platform 200 to the vehicle control interface 300 via the main bus 400 is converted into control data that the first vehicle platform 100A can interpret by the acceleration and deceleration instruction processing unit 3011. In addition, the steering instruction that is transmitted from the autonomous driving platform 200 to the vehicle control interface 300 via the main bus 400 is converted into control data that the first vehicle platform 100A can interpret by the steering instruction processing unit 3012. Then, the control data after the conversion is transmitted to the first vehicle platform 100A via the main bus 400. Accordingly, the vehicle control ECU 101A of the first vehicle platform 100A controls the motor of the vehicle, the brake device 102A, and the steering device 103A in accordance with a control instruction transmitted from the vehicle control interface 300 such that the vehicle autonomously travels along the traveling trajectory generated in the autonomous driving platform 200.

In addition, in a case where the autonomous driving ECU 201 determines that the main electric power source 500 is in an abnormal state in step S101 (result of determination in step S101 is negative), the autonomous driving ECU 201 proceeds to step S103 and performs autonomous stoppage control. An "abnormality in the main electric power source 500" herein means a state where electric power that is not excessive or insufficient in operating each constituent element in the first vehicle platform 100A cannot be supplied from the main electric power source 500 to each constituent element in the first vehicle platform 100A. Examples of such an abnormality include malfunction of the main electric power source 500 and disconnection of an electric power line connecting the main electric power source 500 and each constituent element in the first vehicle platform 100A to each other. Note that, as a method of detecting such an abnormality, a known method can be adopted.

In the autonomous stoppage control, first, the autonomous driving controller 2012 generates a traveling trajectory for causing the vehicle to move to a place where the vehicle can be stopped based on environment data generated by the situation recognition unit 2011, as described above. Next, the autonomous driving ECU 201 determines the degree of acceleration and deceleration and the steering angle of the vehicle such that the vehicle travels along the generated traveling trajectory and is stopped at the place where the vehicle can be stopped. Then, the autonomous driving controller 2012 generates an acceleration and deceleration instruction indicating the determined degree of acceleration and deceleration and a steering instruction indicating the determined steering angle. The acceleration and deceleration instruction and the steering instruction generated by the autonomous driving controller 2012 are transmitted to the vehicle control interface 300 by the communication controller 2013. At this time, the communication controller 2013 transmits the acceleration and deceleration instruction and the steering instruction to the vehicle control interface 300 via the sub bus 401. The acceleration and deceleration instruction that is transmitted from the autonomous driving platform 200 to the vehicle control interface 300 via the sub bus 401 is converted into control data that the second vehicle platform 100B can interpret by the acceleration and deceleration instruction processing unit 3011. In addition, the steering instruction that is transmitted from the autonomous driving platform 200 to the vehicle control interface 300 via the sub bus 401 is converted into control data that the second vehicle platform 100B can interpret by the steering instruction processing unit 3012. Then, the control data after the conversion is transmitted to the second vehicle platform 100B via the sub bus 401. Accordingly, the vehicle control ECU 101B of the second vehicle platform 100B controls the motor of the vehicle, the brake device 102A, and the steering device 103A in accordance with a control instruction transmitted from the vehicle control interface 300 such that the vehicle autonomously stops at the place where the vehicle can be stopped after the vehicle autonomously travels to the place where the vehicle can be stopped along the traveling trajectory generated in the autonomous driving platform 200.

After processing in step S103 is performed, the autonomous driving ECU 201 determines whether the vehicle is stopped at the place where the vehicle can be stopped. Such determination is performed based on the environment data generated by the situation recognition unit 2011 or the position and the speed of the vehicle acquired from information or the like relating to the state of the vehicle that is provided from the second vehicle platform 100B, as described above. That is, a determination is made that the vehicle is stopped at the place where the vehicle can be stopped in a case where the position of the vehicle is in the place where the vehicle can be stopped and the speed of the vehicle is zero. Here, in a case where the vehicle is not stopped at the place where the vehicle can be stopped (result of determination in step S104 is negative) the autonomous driving ECU 201 returns to step S103. Meanwhile, in a case where the vehicle is stopped at the place where the vehicle can be stopped (result of determination in step S104 is positive) the autonomous driving ECU 201 proceeds to step S105.

In step S105, the autonomous driving ECU 201 generates a parking lock switching instruction for switching the parking lock device of the second vehicle platform 100B from a non-parking lock state to a parking lock state. The parking lock switching instruction generated in this manner is transmitted to the vehicle control interface 300 via the sub bus 401 (step S106). The parking lock switching instruction that is transmitted from the autonomous driving platform 200 to the vehicle control interface 300 via the sub bus 401 is converted into control data that the second vehicle platform 100B can interpret by the acceleration and deceleration instruction processing unit 3011. Then, the control data after the conversion is transmitted to the second vehicle platform 100B via the sub bus 401. Accordingly, the vehicle control ECU 101B of the second vehicle platform 100B controls the actuator of the parking lock device in accordance with a control instruction transmitted from the vehicle control interface 300 such that the parking lock device is switched from the non-parking lock state to the parking lock state. As a result, the wheels of the vehicle are locked such that the wheels cannot be rotated and thus the vehicle is restrained from being accidentally moved by the vehicle's own weight.

With the vehicle system according to the present embodiment, even in a case where the first vehicle platform 100A enters a state of being not able to operate normally due to an abnormality in the main electric power source 500, it is possible to cause the vehicle to autonomously stop by using the second vehicle platform 100B that is operated by means of the sub electric power source 501 which is different from the main electric power source 500. Accordingly, it is possible to increase the reliability of the vehicle system.

In addition, in the case of the vehicle system according to the present embodiment, data that the vehicle control interface 300 relays in a case where the first vehicle platform 100A is able to operate normally is narrowed down to an instruction relating to acceleration and deceleration and an instruction relating to steering. Therefore, unnecessary access to vehicle functions can be prevented and thus it is possible to secure safety. Furthermore, it is possible to apply the same autonomous driving platform to various vehicle types when conversion information is prepared. Therefore, it is possible to improve the general-purpose properties of an autonomous driving platform while securing security of a vehicle platform.

Note that, in the present embodiment, a case where there is an abnormality in the main electric power source 500 has been used as an example of a case where the first vehicle platform 100A is not able to operate normally. However, the case where the first vehicle platform 100A is not able to operate normally is not limited thereto and the disclosure also can be applied in a case where the first vehicle platform 100A is not able to operate normally due to an abnormality in a component other than the main electric power source 500.

Other Embodiment

In the above-described embodiment, a configuration in which the vehicle system is provided with the vehicle control interface has been used as an example. However, the first and second vehicle platforms may directly exchange data with the autonomous driving platform. In a case where the autonomous driving ECU of the autonomous driving platform is configured to be able to generate data that the vehicle control ECU of the first vehicle platform and the vehicle control ECU of the second vehicle platform can interpret, the vehicle system may be configured such that the first and second vehicle platforms and the autonomous driving platform exchange data with each other not via the vehicle control interface.

Modification Example

The above-described embodiments are merely examples and the disclosure can be implemented with appropriate modifications without departing from the gist of the disclosure. For example, the processes or means described in the disclosure can be freely combined with each other as long as there is no technical contradiction.

In addition, a process that has been described as a process performed by one device may be divided up and performed by a plurality of devices. Alternatively, a process that has been described as a process performed by different devices may be performed by one device. It is possible to flexibly change with what kind of hardware configuration (server configuration) each function is realized in a computer system.

The disclosure also can be realized when a computer program, in which the functions described in the above-described embodiments are mounted, is supplied to a computer and one or more processors of the computer reads and executes the program. Such a computer program may be provided to a computer via a non-transitory computer-readable storage medium that can be connected to a system bus of the computer and may be provided to the computer via a network. Examples of the non-transitory computer-readable storage medium include any type of disk such as a magnetic disk (floppy (registered trademark) disk, hard disk drive (HDD), or like) and an optical disk (CD-ROM, DVD disk, Blu-ray disk, or like), a read only memory (ROM), a random access memory (RAM), an EPROM, an EEPROM, a magnetic card, a flash memory, an optical card, and any type of medium suitable for storing electronic commands.

What is claimed is:

1. A vehicle system comprising:
    a first vehicle platform that includes a first computer configured to operate by means of electric power supplied from a first electric power source and perform traveling control of a vehicle;
    a second vehicle platform that includes a second computer configured to operate by means of electric power supplied from a second electric power source different from the first electric power source and perform traveling control of the vehicle;
    an autonomous driving platform that includes a third computer configured to perform autonomous driving control of the vehicle by transmitting a control instruction including data for autonomously driving the vehicle to the first computer when the first vehicle platform is in a normal state and perform autonomous stoppage control of the vehicle by transmitting a control instruction including data for causing the vehicle to autonomously stop to the second computer when the first vehicle platform is in an abnormal state; and
    a vehicle control interface configured to acquire a first control instruction, which is a control instruction transmitted from the third computer to the first computer or the second computer, convert the first control instruction into a second control instruction with respect to the first computer or the second computer, and transmit the second control instruction to the first computer or the second computer, wherein
    the first control instruction is data that the first computer and the second computer cannot interpret, and
    the second control instruction is data that the first computer and the second computer can interpret.

* * * * *